US012110043B2

United States Patent
Yang et al.

(10) Patent No.: US 12,110,043 B2
(45) Date of Patent: Oct. 8, 2024

(54) AUTONOMOUS CONTROLLER AND METHOD THEREOF

(71) Applicants: HYUNDAI MOTOR COMPANY, Seoul (KR); KIA MOTORS CORPORATION, Seoul (KR)

(72) Inventors: Na Eun Yang, Gyeonggi-do (KR); Jin Su Jeong, Suwon-si (KR); Jae Yong Jeon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 379 days.

(21) Appl. No.: 17/111,103

(22) Filed: Dec. 3, 2020

(65) Prior Publication Data

US 2021/0206393 A1    Jul. 8, 2021

Related U.S. Application Data

(60) Provisional application No. 62/956,654, filed on Jan. 3, 2020.

(30) Foreign Application Priority Data

Oct. 16, 2020    (KR) .................. 10-2020-0134500

(51) Int. Cl.
*B60W 60/00*      (2020.01)
*B60K 35/00*      (2006.01)
(Continued)

(52) U.S. Cl.
CPC ......... *B60W 60/0051* (2020.02); *B60K 35/00* (2013.01); *B60W 40/08* (2013.01);
(Continued)

(58) Field of Classification Search
CPC .. B60W 60/0051; B60W 40/08; B60W 50/16; B60W 2540/227; B60W 2050/143;
(Continued)

(56) References Cited

U.S. PATENT DOCUMENTS

| | | | |
|---|---|---|---|
| 8,874,301 B1* | 10/2014 | Rao ...................... | G05D 1/0061 340/576 |
| 2014/0358376 A1* | 12/2014 | Phelan .................. | B60W 10/20 701/41 |

(Continued)

FOREIGN PATENT DOCUMENTS

| | | | | |
|---|---|---|---|---|
| CN | 108423003 | * | 8/2018 | ............ B60W 40/08 |
| EP | 3838703 A1 | | 6/2021 | |

(Continued)

OTHER PUBLICATIONS

Extended European Search Report dated May 31, 2021, in corresponding European Application No. 20210925.2-1012 (9pgs.).

(Continued)

*Primary Examiner* — Joan T Goodbody
(74) *Attorney, Agent, or Firm* — Lempia Summerfield Katz LLC

(57) ABSTRACT

The autonomous controller includes: a processor configured to control autonomous driving, calculate a safety area, and determine conversion into an autonomous driving mode based on a current location of the driver's seat; and a storage configured to store information about the safety area, data, and an algorithm run by the processor. The processor is configured to convert a manual driving mode into the autonomous driving mode when the current location of the driver's seat is within the safety area or when a request for conversion into the autonomous driving mode is input while driving in the manual driving mode, and move the current location of the driver's seat into the safety area and convert the manual driving mode into the autonomous driving mode (Continued)

when the current location of the driver's seat is not within the safety area.

13 Claims, 4 Drawing Sheets

(51) Int. Cl.
  B60W 40/08 (2012.01)
  B60W 50/16 (2020.01)
  B60K 35/23 (2024.01)
  B60K 35/25 (2024.01)
  B60K 35/26 (2024.01)
  B60K 35/28 (2024.01)
  B60W 50/14 (2020.01)

(52) U.S. Cl.
  CPC ............. B60W 50/16 (2013.01); *B60K 35/23* (2024.01); *B60K 35/25* (2024.01); *B60K 35/26* (2024.01); *B60K 35/28* (2024.01); *B60K 2360/166* (2024.01); *B60K 2360/178* (2024.01); *B60W 2050/143* (2013.01); *B60W 2050/146* (2013.01); *B60W 2520/10* (2013.01); *B60W 2540/227* (2020.02); *B60W 2552/53* (2020.02)

(58) Field of Classification Search
  CPC ........ B60W 2050/146; B60W 2520/10; B60K 2370/1529; B60K 2370/158; B60K 2370/166; B60K 2370/178; B60K 2370/157

See application file for complete search history.

(56) References Cited

U.S. PATENT DOCUMENTS

| | | | |
|---|---|---|---|
| 2017/0205823 A1* | 7/2017 | Arndt | B60Q 5/005 |
| 2017/0364070 A1* | 12/2017 | Oba | B60W 50/14 |
| 2018/0222490 A1* | 8/2018 | Ishihara | B60K 35/00 |
| 2018/0272895 A1* | 9/2018 | Schmidt | B60N 2/0232 |
| 2020/0001812 A1 | 1/2020 | Cho | |
| 2021/0188324 A1 | 6/2021 | Kim et al. | |

FOREIGN PATENT DOCUMENTS

| | | | | |
|---|---|---|---|---|
| FR | 3039123 A | | 1/2017 | |
| JP | 2018176932 | * | 11/2018 | ............... B60N 2/06 |
| KR | 2019-0105207 A | | 9/2019 | |
| WO | WO2017142935 | * | 8/2017 | ........... G05D 1/0061 |

OTHER PUBLICATIONS

Office Action cited in European patent application No. 20210925. 2-1001.

\* cited by examiner

AUTONOMOUS CONTROLLER AND METHOD THEREOF

CROSS-REFERENCE TO RELATED APPLICATION

This application claims priority to and the benefit of U.S. Patent Application No. 62/956,654, filed on Jan. 3, 2020, and Korean Patent Application No. 10-2020-0134500, filed on Oct. 16, 2020, the entire contents of which are incorporated herein by reference.

FIELD

The present disclosure relates to an autonomous controller and a method thereof.

BACKGROUND

The statements in this section merely provide background information related to the present disclosure and may not constitute prior art.

The vehicle is a device which travels on the road, which is loaded with various devices for protecting passengers, assisting operation, or improving quality of ride.

Recently, research has been actively conducted in an autonomous controller such that the vehicle automatically travels to a destination by controlling the vehicle to recognize road environments by itself, determine driving situations, and travel along a planned driving route.

Such an autonomous controller recognizes a change in location of an obstacle and a lane and controls the vehicle to travel on a safe lane while avoiding the obstacle based on the recognized information.

When an unexpected situation occurs while controlling autonomous driving of the vehicle, the autonomous controller hands over control authority of the vehicle to the driver. However, if the driver's seat is a in a state in which the driver cannot immediately take over the control authority, the handing over of the control authority may be delayed and the risk of an accident may be increased.

SUMMARY

The present disclosure provides an autonomous controller for calculating a safety area of the driver's seat and automatically controlling the driver's seat to be in a state where a driver can keep his or her eyes on the road when the driver wants to convert a manual driving mode into an autonomous driving mode while driving in the manual driving mode, and a method thereof.

According to one form of the present disclosure, an autonomous controller may include: a processor configured to control autonomous driving and calculate a safety area, and determine conversion into an autonomous driving mode based on a current location of the driver's seat; and a storage configured to store information about the safety area and data and an algorithm run by the processor. The processor may convert a manual driving mode into the autonomous driving mode when the current location of the driver's seat is within the safety area, when a request for conversion into the autonomous driving mode is input while driving in the manual driving mode, and may move the current location of the driver's seat into the safety area and converts the manual driving mode into the autonomous driving mode when the current location of the driver's seat is not within the safety area.

In one form, the autonomous controller may further include an interface that is configured to be controlled by the processor and to output a state of the autonomous driving mode or the manual driving mode.

In one form, the processor may control the interface to notify a driver that it is impossible to convert the manual driving mode into the autonomous driving mode when it is impossible to move the current location of the driver's seat into the safety area.

In one form, the processor may determine safety of the current location of the driver's seat using at least one of a location of the vehicle in the lane, a distance from a forward vehicle, a change in vehicle speed, whether there is rapid deceleration or acceleration, or a face location of a driver, and may calculate the safety area based on the current location of the driver's seat.

In one form, the processor may calculate the current location of the driver's seat as the safety area when a rate at which the center of a vehicle departs from the center of the lane over a certain level during a predetermined time is not greater than a predetermined threshold.

In one form, the processor may calculate the current location of the driver's seat as the safety area when a deviation of a distance from the center of a vehicle from the center of the lane during a predetermined time is not greater than a predetermined threshold.

In one form, the processor may calculate the current location of the driver's seat as the safety area when an inter-vehicle distance between a host vehicle and a forward vehicle is kept constant over a predetermined threshold.

In one form, the processor may calculate a collision minimum safe distance from a forward vehicle using a relative vehicle speed with respect to the forward vehicle, and may calculate the current location of the driver's seat as the safety area when a rate at which a host vehicle violates the collision minimum safe distance during a predetermined time is not greater than a predetermined value.

In one form, the processor may calculate the current location of the driver's seat as the safety area when an amount of change in vehicle speed during a predetermined time is less than a predetermined value.

In one form, the processor may calculate the current location of the driver's seat as the safety area depending on whether rapid acceleration or deceleration occurs during a predetermined time.

In one form, the processor may calculate the current location of the driver's seat as the safety area when a face location of a driver is within a predetermined range.

In one form, the processor may calculate the current location of the driver's seat as the safety area when the face location of the driver is at a location that is the least obstructive to a view of the driver.

In one form, the processor may calculate a safety area for each driver based on authentication information for each driver and may store information about the calculated safety area in the storage.

In one form, the safety area may include information about a sliding location, a reclining angle, and a height of the driver's seat.

In one form, the interface may include at least one of a cluster, a head up display, an audio, video, navigation (AVN), a display, a warning sound speaker, or a haptic device.

According to another form of the present disclosure, an autonomous control method may include: calculating a safety area for determining conversion into an autonomous driving mode based on a current location of the driver's seat during manual driving; storing information about the safety area; determining whether the current location of the driver's seat is within the safety area when a request for conversion into the autonomous driving mode is input while driving in a manual driving mode; converting the manual driving mode into the autonomous driving mode when the current location of the driver's seat is within the safety area; and moving the current location of the driver's seat into the safety area and converting the manual driving mode into the autonomous driving mode when the current location of the driver's seat is not within the safety area.

In one form, the autonomous control method may further include notifying a driver that it is impossible to convert the manual driving mode into the autonomous driving mode, when it is impossible to move the current location of the driver's seat into the safety area.

In one form, the previous calculating and storing of the safety area may include determining safety of the current location of the driver's seat using at least one of a location of a vehicle in the lane, a distance from a forward vehicle, a change in vehicle speed, whether there is rapid deceleration or acceleration, or a face location of a driver and calculating the safety area based on the current location of the driver's seat.

In one form, calculating and storing of the safety area may include calculating a safety area for each driver based on authentication information for each driver and storing information about the calculated safety area.

In one form, the safety area may include information about a sliding location, a reclining angle, and a height of the driver's seat.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
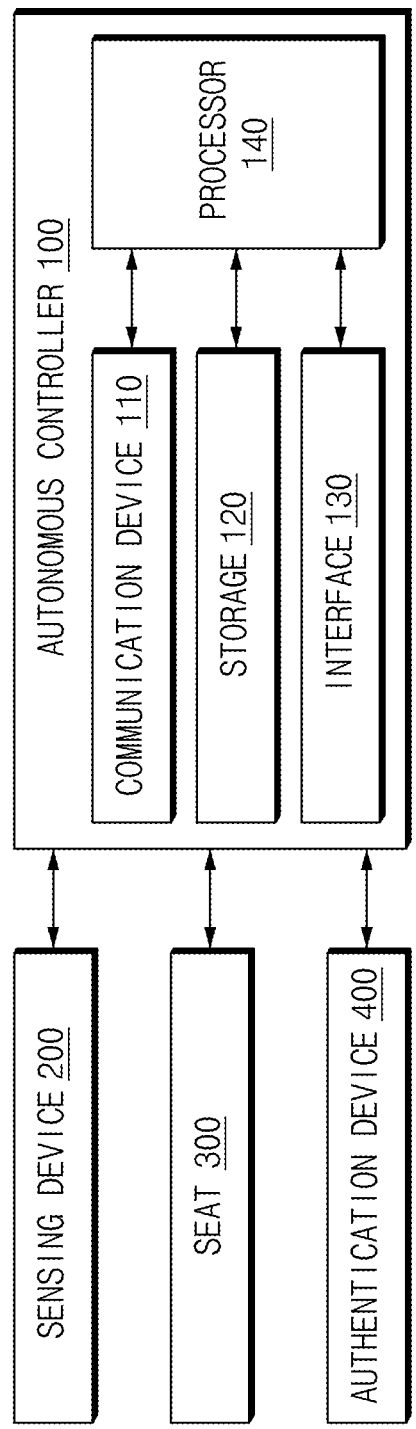
FIG. 1 is a block diagram illustrating a configuration of a vehicle system including an autonomous driving controller according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing components of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific teams, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

One form of the present disclosure discloses technologies of adjusting a location of the driver's seat such that it is easy for a driver to always keep his or her eyes on the road, manipulate a steering wheel, brake, and use other manipulators, when changing a manual driving mode to an autonomous driving mode while an autonomous vehicle is traveling in the manual driving mode, and automatically controlling the driver's seat to safely hand over control authority to the driver when handing over the control authority to the driver in an emergency situation.

Hereinafter, various forms of the present disclosure will be described in detail with reference to FIGS. 1 to 4.

FIG. 1 is a block diagram illustrating a configuration of a vehicle system including an autonomous controller according to one form of the present disclosure.

Referring to FIG. 1, an autonomous controller 100 according to one form of the present disclosure may be implemented in a vehicle. In this case, the autonomous controller 100 may be integrally configured with control units in the vehicle or may be implemented as a separate device to be connected with the control units of the vehicle by a separate connection means.

The vehicle system may include the autonomous controller 100, a sensing device 200, a seat 300, and an authentication device 400.

The autonomous controller 100 may control autonomous driving and calculate a safety area for determining conversion into an autonomous driving mode based on a current location of the driver's seat. When a request for conversion into the autonomous driving mode is input while driving in a manual driving mode, the autonomous controller 100 may convert the manual driving mode into the autonomous driving mode when the current location of the driver's seat is located within the safety area, move the current location of the driver's seat into the safety area, and convert the manual driving mode into the autonomous driving mode when the current location of the driver's seat is not located within the safety area.

In this case, the safety area may include information about a sliding location, a reclining angle, and a height of the driver's seat in a state where it is easy for a driver to always keep his or her eyes on the road, manipulate a steering handle, brake, and use other manipulators.

The autonomous controller 100 according to one form of the present disclosure, which performs the above-mentioned operations, may be implemented in the form of an independent hardware device including a memory and a processor for processing each operation or may be driven in the form of being included in another hardware device such as a microprocessor or a universal computer system.

The autonomous controller 100 may include a communication device 110, a storage 120, an interface 130, and a processor 140.

The communication device 110 may be a hardware device implemented with various electronic circuits to transmit and receive a signal through a wireless or wired connection. In one form of the present disclosure, the communication device 110 may perform a network communication technology in the vehicle and may perform vehicle-to-infrastructure (V2I) communication with a server, an infrastructure, or another vehicle outside the vehicle using wireless Internet technology or short range communication technology. Herein, the network communication technology in the vehicle may be to perform inter-vehicle communication through controller area network (CAN) communication, local interconnect network (LIN) communication, flex-ray communication, or the like. Furthermore, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may perform inter-vehicle communication with the sensing device 200, the seat 300, and the authentication device 400.

The storage 120 may store a sensing result of the sensing device 200, data obtained by the processor 140, or data, an algorithm, and/or the like necessary for an operation of processor 140.

As an example, the storage 120 may store information about a safety area calculated by the processor 140. Furthermore, the storage 120 may store data and an algorithm for calculating a safety area. Furthermore, the storage 120 may store data for conversion of the autonomous driving mode and the manual driving mode. Furthermore, the storage 120 may store information about a forward obstacle, for example, a forward vehicle, which is detected by the sensing device 200 to control autonomous driving. Furthermore, the storage 120 may store information about a safety area for each driver.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The interface 130 may include an input means for receiving a control command from a user and an output means for outputting an operation state, an operation result, or the like of the autonomous controller 100.

Herein, the input means may include a key button and may further include a mouse, a joystick, a jog shuttle, a stylus pen, or the like. Furthermore, the input means may further include a soft key implemented on a display.

The output means may include the display and may further include a voice output means such as a speaker. In this case, when a touch sensor such as a touch film, a touch sheet, or a touch pad is provided in the display, the display operates as a touchscreen and may be implemented in a form where the input means and the output means are integrated with each other. As an example, the output means may output conversion of the autonomous driving mode and the manual driving mode, an autonomous driving enable state, an autonomous driving disable state, an autonomous driving impossible notification, an autonomous driving possible notification, or the like. As an example, the output means may be implemented as a cluster, a head up display, an audio, video, navigation (AVN), a display, a warning sound speaker, a haptic device, or the like.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected with the communication device 110, the storage 120, the interface 130, or the like and may electrically control the respective components. The processor 140 may be an electrical circuit which executes instructions of software and may perform a variety of data processing and calculation, which will be described below. The processor 140 may be, for example, an electronic control unit (ECU), a micro controller unit (MCU), or another sub-controller, which is loaded into the vehicle.

The processor 140 may control the overall operation of autonomous driving, may control conversion of the manual driving mode and the autonomous driving mode, or the like. The processor 140 may determine whether the driver is in a state for taking over control authority when converting the autonomous driving mode into the manual driving mode and may convert the autonomous driving mode into the manual driving mode. In other words, the processor 140 may calculate a safety area for determining conversion into the autonomous driving mode based on a current location of the driver's seat and may convert the manual driving mode into the autonomous driving mode when the current location of the driver's seat is located within the safety area, that is, when it is easy for the driver to always keep his or her eyes on the road, manipulate a steering handle, brake, and use other manipulators.

When a request for conversion into the autonomous driving mode is input while driving in the manual driving mode, the processor 140 may convert the manual driving mode into the autonomous driving mode when the current location of the driver's seat is located within the previously calculated safety area and may move the current location of the driver's seat into the safety area and may convert the manual driving mode into the autonomous driving mode when the current location of the driver's seat is not located within the safety area.

When it is impossible to move the current location of the driver's seat into the safety area, the processor 140 may notify the driver that it is impossible to convert the manual driving mode into the autonomous driving mode by means of the interface 130. In this case, the processor 140 may determine that there is an external load (an obstacle) when a current value greater than a reference current value occurs, based on a motor current sensor or the like and may determine that it is impossible to move the current location of the driver's seat into the safety area, using the other sensors. Furthermore, the processor 140 may notify the driver of a cause of that it is impossible to move the current location of the driver's seat into the safety area by means of the interface 130 and may output a notification of guiding the driver to remove the cause (e.g., an obstacle) of which makes moving the current location of the driver's seat into the safety area impossible by means of the interface 130.

Furthermore, when the current location of the driver's seat is within the safety area to convert the manual driving mode into the autonomous driving mode, the processor 140 may notify the driver that the manual driving mode is converted into the autonomous driving mode by means of the interface 130.

The processor 140 may determine safety of the current location of the driver's seat using at least one of a location of the vehicle in the lane, a distance from a forward vehicle, a change in vehicle speed, whether there is rapid deceleration or acceleration, or a face location of the driver and may calculate a safety area based on the current location of the driver's seat.

A description will be given in detail of a condition of calculating the safety area. When a rate at which the center of the vehicle departs from the center of the lane over a certain level during a predetermined time is not greater than a predetermined threshold, the processor 140 may calculate the current location of the driver's seat as the safety area. When a deviation of a distance from the center of the vehicle from the center of the lane during a predetermined time is not greater than the predetermined threshold, the processor 140 may calculate the current location of the driver's seat as the safety area.

When an inter-vehicle distance between a host vehicle and a forward vehicle is kept constant over a predetermined threshold, the processor 140 may calculate the current location of the driver's seat as the safety area.

The processor 140 may calculate a collision minimum safe distance from a following vehicle using a relative vehicle speed with respect to the following vehicle. When a rate at which the host vehicle violates the collision minimum safe distance during a predetermined time is not greater than a predetermined value, the processor 140 may calculate the current location of the driver's seat as the safety area.

When an amount of change in vehicle speed during a predetermined time is less than a predetermined value, the processor 140 may calculate the current location of the driver's seat as the safety area.

The processor 140 may calculate the current location of the driver's seat as the safety area depending on whether rapid deceleration or acceleration occurs during a predetermined time. In this case, the processor 140 may determine rapid acceleration or deceleration using a change value of acceleration of the vehicle. In this case, the rapid acceleration or rapid deceleration may include acceleration of more than a predetermined threshold or deceleration of less than a predetermined threshold.

When a face location of the driver is within a predetermined range, the processor 140 may calculate the current location of the driver's seat as the safety area.

When the face location of the driver is a location at which a view of the driver is the least obstructed, the processor 140 may calculate the current location of the driver's seat as the safety area.

As such, when steering, braking, acceleration adjustment, or the like is suitably performed during manual driving, the processor 140 may calculate the current location of the driver's seat as the safety area. Furthermore, when it is possible to authenticate the driver, the processor 140 may calculate a safety area for each driver and may update the safety area based on a learning algorithm.

Furthermore, the processor 140 may calculate a safety area using a certain distance and a certain angle with respect to a maximum or minimum movement distance of a seat in a trail and a reclining maximum or minimum angle on design.

Furthermore, the processor 140 may measure body information of the driver to calculate a safety area of a seat with respect to a criterion. In this case, the sensing device 200 may include various sensors for measuring the body information of the driver.

The processor 140 may perform authentication of the driver and when the authentication success, the processor may move the driver's seat using the stored safety area.

The sensor device 200 may include one or more sensors which detect an obstacle, for example, a forward vehicle, which is located around the vehicle, and measure a distance from the obstacle and/or a relative speed with respect to the obstacle.

The sensing device 200 may have a plurality of sensors to sense objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

The authentication device 400 may perform authentication for each driver using a key of the vehicle, a smartphone, iris recognition, face recognition, or the like and may have a means for such authentication. In this case, the authentication device 400 may be implemented as an authentication means, a driver monitoring system, and the like used upon entrance of the vehicle.

Figure 2:
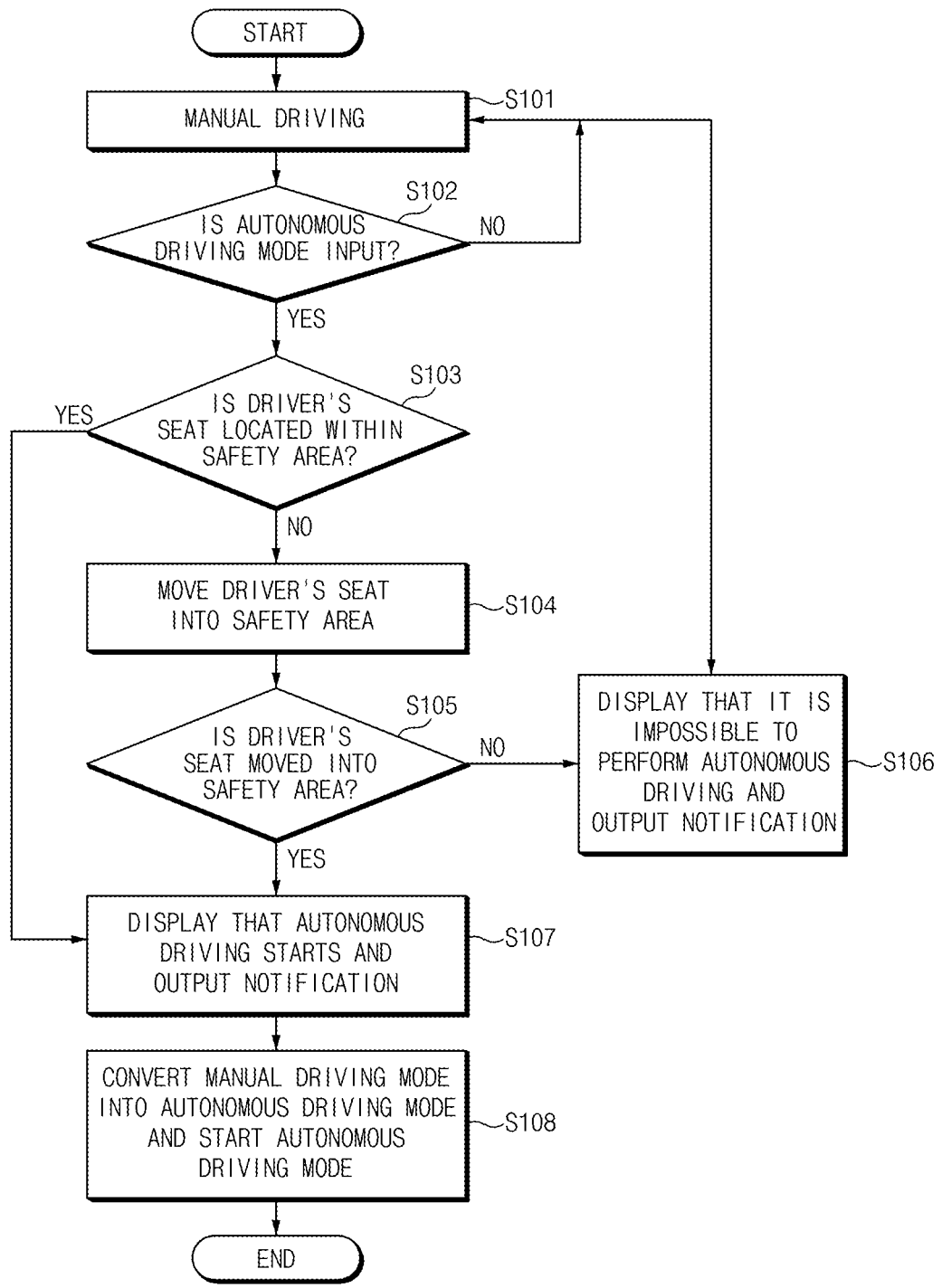
FIG. 2 is a flowchart illustrating a method for controlling a seat during autonomous driving according to one form of the present disclosure.

Hereinafter, a description will be given in detail of an autonomous control method according to one form of the present disclosure with reference to FIG. 2. FIG. 2 is a flowchart illustrating an autonomous control method according to one form of the present disclosure.

Hereinafter, it is assumed that an autonomous controller 100 of FIG. 1 performs a process of FIG. 2. Furthermore, in a description of FIG. 2, an operation described as being performed by an apparatus may be understood as being controlled by a processor 140 of the autonomous controller 100.

Referring to FIG. 2, the apparatus may determine a location of a seat suitable for a driver based on a sliding location, a reclining angle, or a height of the seat, which is determined before manual driving starts after the driver rides in a vehicle. In this case, the location of the seat suitable for the driver may be a specific value or a specific range.

When a manual driving mode starts in S101, in S102, the apparatus may determine whether there is a request for conversion into an autonomous driving mode during manual driving. In this case, the apparatus may receive the request for conversion into the autonomous driving mode from the driver by means of an interface 130 of FIG. 1.

When there is the request for conversion into the autonomous driving mode, in S103, the apparatus may determine whether a current location of the driver's seat is within a predetermined safety area.

In this case, the safety area may include an area in a sliding distance, a height, or a reclining angle of the driver's seat at which it is possible for the driver to manipulate a steering handle, a brake, and a manipulator switch (e.g., emergency lights or the like).

When the current location of the driver's seat is within the predetermined safety area, in S107, the apparatus may display that the autonomous driving mode starts and may output a notification to the driver.

On the other hand, when the current location of the driver's seat is not within the predetermined safety area, in S104, the apparatus may move the current location of the driver's seat into the safety area.

In S105, the apparatus may determine whether the moved location of the driver's seat is within the predetermined safety area again. When the current location of the driver's seat is not still within the predetermined safety area, in S106, the apparatus may display that it is impossible to perform autonomous driving and may output a notification to the driver.

On the other hand, when the current location of the driver's seat is within the predetermined safety area, in S107, the apparatus may display that the autonomous driving mode starts and may output a notification to the driver.

In S108, the apparatus may convert the manual driving mode into the autonomous driving mode to start to control autonomous driving.

As such, when the driver starts to drive in the manual driving mode and attempts to enable the autonomous driving mode, the apparatus according to one form of the present disclosure may determine whether the current location of the driver's seat is within the safety area. When the current location of the driver's seat is within the safety area, the apparatus may notify the driver that autonomous driving starts, may convert the manual driving mode into the autonomous driving, and may start autonomous driving.

On the other hand, when the driver attempts to enable the autonomous driving mode, but when the driver's seat is not located within the safety area, the apparatus may move the driver's seat to be located within the safety area. Only when the driver seat is located within the safety area, the apparatus may notify the driver that autonomous driving starts, may convert the manual driving mode into the autonomous driving mode, and may start autonomous driving.

When it is impossible to move the driver's seat due to the cause of an external factor (e.g., an obstacle or the like), breakdown of the seat itself, or the like, the apparatus may notify the driver that it is impossible to perform autonomous driving and may fail to convert the manual driving mode into the autonomous driving mode. Furthermore, the apparatus may output a notification message to remove an obstacle for movement of the driver's seat.

Figure 3:
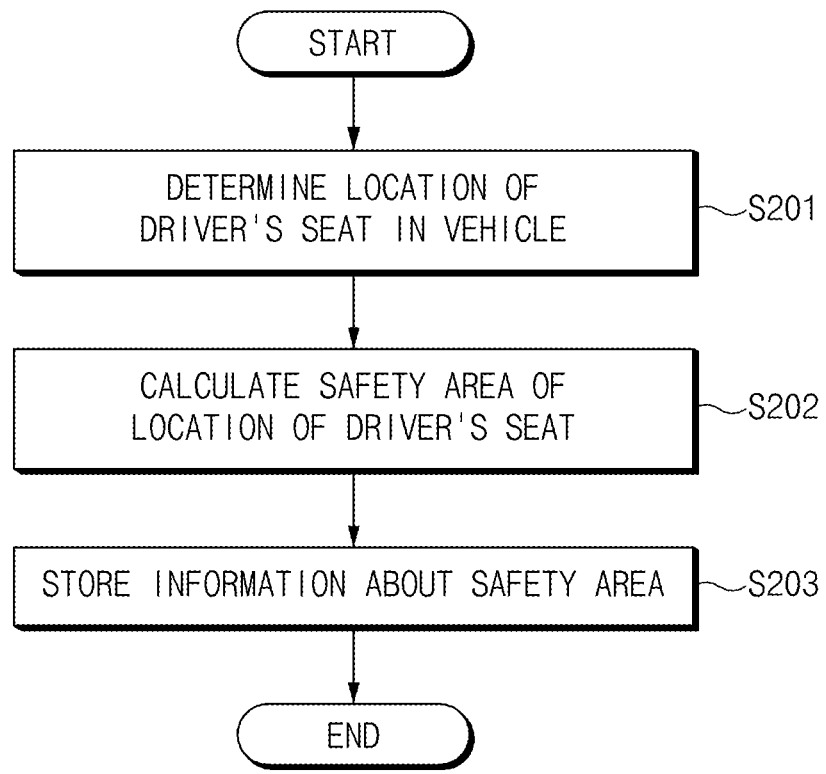
FIG. 3 is a flowchart illustrating a method for calculating a safety area at a seat location during autonomous driving according to one form of the present disclosure.

Hereinafter, a description will be given in detail of a method for calculating a safety area when controlling autonomous driving according to one form of the present disclosure with reference to FIG. 3. FIG. 3 is a flowchart illustrating a method for calculating a safety area when controlling autonomous driving according to one form of the present disclosure.

Hereinafter, it is assumed that an autonomous controller 100 of FIG. 1 performs a process of FIG. 3. Furthermore, in a description of FIG. 3, an operation described as being performed by an apparatus may be understood as being controlled by a processor 140 of the autonomous controller 100.

In S201, the apparatus may determine a location of the driver's seat in a vehicle during manual driving. In other words, the apparatus may determine whether steering manipulation and acceleration and deceleration manipulation are suitably performed at a current location of the driver's seat during manual driving to determine the current location of the driver's seat.

In S202, the apparatus may determine safety of the current location of the driver's seat using at least one of a location of the vehicle in the lane, a distance from a forward vehicle, a change in vehicle speed, whether there is rapid deceleration or acceleration, or a face location of the driver and may calculate a safety area based on the current location of the driver's seat meeting the safety.

First, when the vehicle does not perform driving departing from the center of the lane on a general road having lanes, that is, when a rate at which the center of the vehicle departs from the center of the lane over a certain level during a predetermined time is not greater than a predetermined threshold, the apparatus may calculate the current location of the driver's seat as the safety area.

Secondly, when a deviation of a distance from the center of the vehicle from the center of the lane during a predetermined time is not greater than a predetermined threshold, the apparatus may calculate the current location of the driver's seat as the safety area.

Thirdly, when a distance from a forward vehicle is kept constant over a specific threshold, the apparatus may determine that the current location of the driver's seat is safe.

In other words, when maintaining a relative vehicle speed with respect to the forward vehicle in a situation where the forward vehicle is detected, the apparatus may calculate a collision minimum safe distance after a predetermined time (e.g., one second). The collision minimum safe distance may be represented as Equation 1 below.

$$\text{Collision minimum safe distance [m]} = \text{(relative vehicle speed with respect to forward vehicle [m/s])} * 1 \text{ [s]} \quad \text{[Equation 1]}$$

In other words, when a rate at which a host vehicle violates the collision minimum safe distance during the predetermined time is not greater than a predetermined threshold, the apparatus may calculate the current location of the driver's seat as the safety area.

Fourthly, when a rapid change in speed does not occur, the apparatus may determine that the current location of the driver's seat is safe.

When an amount of change in vehicle speed during a predetermined time is less than a predetermined value, the apparatus may calculate the current location of the driver's seat as the safety area.

Fifthly, the apparatus may calculate safety of the current location of the driver's seat depending on whether rapid acceleration or deceleration occurs during a predetermined time. In other words, when rapid acceleration or deceleration does not occur during the predetermined time or when a rapid acceleration or deceleration rate is less than or equal to a predetermined rate, the apparatus may calculate the current location of the driver's seat as the safety area.

Furthermore, the apparatus may determine safety of the current location of the driver's seat depending on whether an absolute value of acceleration of a host vehicle during a predetermined time is greater than a predetermined value. In other words, when the absolute value of the acceleration of the host vehicle is not greater than the predetermined value, the apparatus may calculate the current location of the driver's seat as the safety area.

Sixthly, when a face location of the driver is within a predetermined range, the apparatus may determine the current location of the driver's seat as the safety area. In other words, when a face of the driver is present within a location at which a view of the driver is the least obstructed, the apparatus may determine that the current location of the driver's seat is safe.

The apparatus may make a margin with respect to the location of the driver's seat meeting the above-mentioned conditions to calculate the safety area. When the above-mentioned conditions are met although there is a change in the location of the driver's seat, the apparatus may continue updating the safety area.

In this case, the margin may be a certain distance from a predetermined seat location or may be calculated by applying a different weight to a predetermined direction. As such, the apparatus may include the entire area including all of a plurality of safe locations in the safety area and may include middle points of sporadic locations in the safety area by applying suitable interpolation to the middle points of the sporadic locations.

Furthermore, the apparatus may use various methods as the method for specifying the range of the safety area and may calculate the safety area using a sensor or the like capable of measuring a body of the driver. The apparatus may finally calculate the safety area with regard to a specific range and an error range of a specific angle from a location of each seat based on locations of the seat meeting the above-mentioned conditions for calculating the safety area.

In S203, the apparatus may store information about the calculated safety area in a storage 120 of FIG. 1. In this case, when it is possible to perform driver authentication, the apparatus may store information about a safety area calculated for each driver. In this case, the driver authentication may be performed by means of an authentication means, a driver monitoring system, and the like used when the driver enters the vehicle. In this case, although the ignition is turned off, the apparatus may continue storing the information about the safety area for each driver. Furthermore, when it is impossible to perform driver authentication, but there are several seat locations stored by a user, the apparatus may store information about each safety area on the basis of the location of the driver's seat.

Furthermore, the apparatus may store a location of the driver's seat, which is separately stored by the driver, as the safety area. At this time, when there is success in driving authentication, it is possible to store the location of the driver's seat, which is separately stored by the driver, as the safety area.

The apparatus may calculate and store an area where 95% of adults may manipulate a steering handle and a pedal as the safety area at a maximum or minimum movement distance of a seat in the trail and a reclining maximum or minimum angle on design in an initial state where information about a safety area, authentication information, or the like is not stored. When the current location of the driver's seat departs from an initially stored safety area, the apparatus may recalculate and supplement a safety area based on the current location of the driver's seat.

Furthermore, the apparatus may authenticate the driver using a specific authentication means (e.g., a key, a smartphone, or the like) of the driver or biometric information (e.g., iris recognition information or face recognition information) of the driver. When there is previously calculated safety area information, the apparatus may correct a location of the driver's seat using the previously stored safety area information.

As such, the apparatus according to one form of the present disclosure may move a current location of the driver's seat such that it is easy for the driver to manipulate a steering handle, break, and use the other manipulators in the autonomous driving mode. Because an emergency situation occurs, when suddenly converting the autonomous driving mode into the manual driving mode, the apparatus may safely hand over control authority to the driver.

Figure 4:
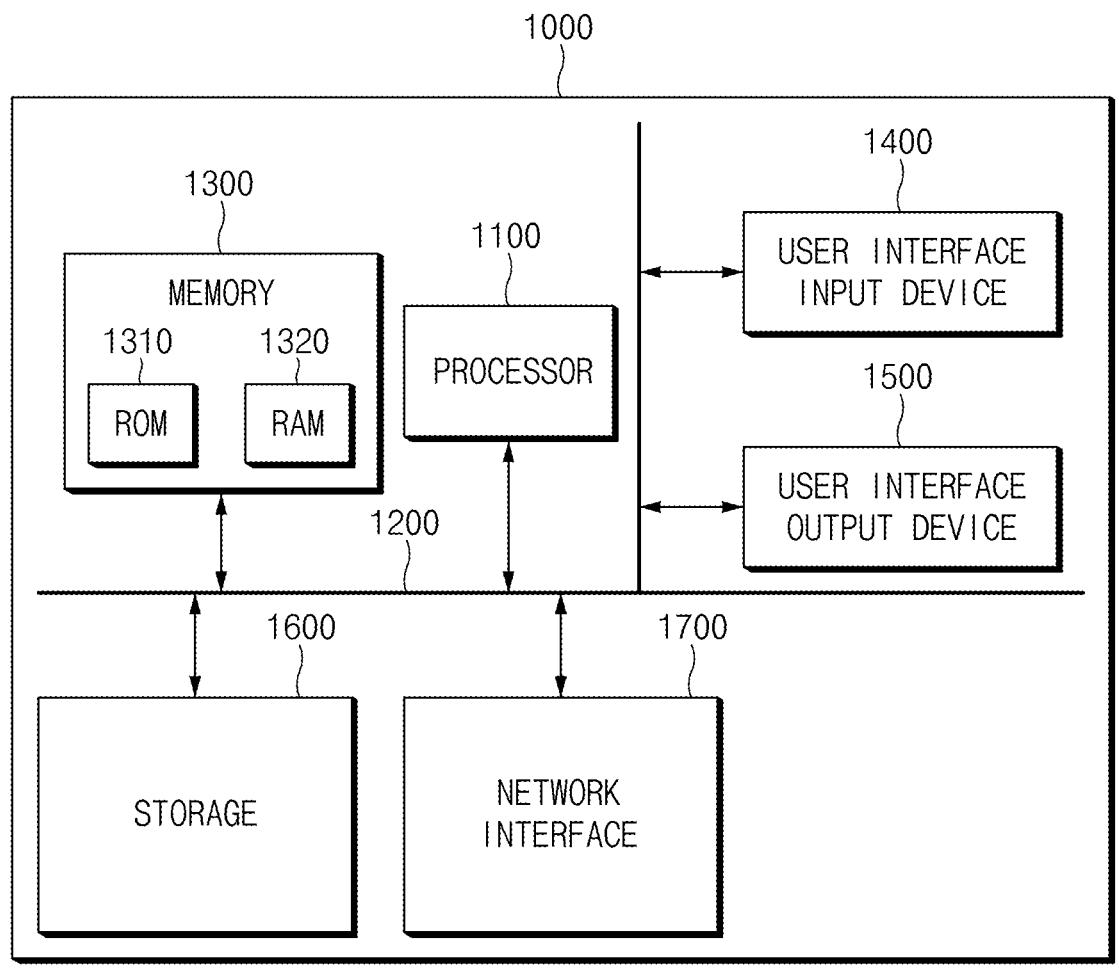
FIG. 4 is a block diagram illustrating a computing system according to one form of the present disclosure.

FIG. 4 is a block diagram illustrating a computing system according to one form of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with various forms disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may calculate a safety area of the driver's seat and may automatically control the driver's seat to be in a state where the driver keeps his or her eyes on the road, when the driver wants to convert a manual driving mode into an autonomous driving mode while driving in the manual driving mode, thus increasing safety of autonomous driving.

In addition, various effects ascertained directly or indirectly through the present disclosure may be provided.

Hereinabove, although the present disclosure has been described with reference to various forms and the accompanying drawings, the present disclosure is not limited thereto, but may be variously modified and altered by those skilled in the art to which the present disclosure pertains without departing from the spirit and scope of the present disclosure claimed in the following claims.

Therefore, various forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An autonomous controller comprising:
   a processor configured to control autonomous driving of a vehicle, calculate a safety area for a driver of the vehicle to able to keep eyes of the driver on a road, and determine conversion into an autonomous driving mode based on a current location of a seat of the driver, wherein the safety area includes information about at least one of a sliding location, a reclining angle, or a height of the seat of the driver, and wherein the processor is configured to calculate the safety area based on a location of the seat of the driver in response to determining, based on least one of a location of the vehicle in a lane, a distance from a forward vehicle, a change in vehicle speed, whether there is rapid deceleration or acceleration, or a face location of the driver, that the location of the seat of the driver is safe;
a storage configured to store information about the safety area, data, and an algorithm run by the processor; and
an interface configured to be controlled by the processor, and to output a state of the autonomous driving mode or a manual driving mode,
wherein the processor is configured to:
determine to convert the manual driving mode into the autonomous driving mode when the current location of the seat of the driver is within the safety area or when a request for the conversion into the autonomous driving mode is input while driving in the manual driving mode,
when the current location of the seat of the driver is not within the safety area, move the current location of the seat of the driver into the safety area and convert the manual driving mode into the autonomous driving mode, and
control the interface to notify the driver that it is impossible to convert the manual driving mode into the autonomous driving mode when it is impossible to move the current location of the seat of the driver into the safety area.

2. The autonomous controller of claim 1, wherein the interface includes at least one of a cluster, a head up display, an audio, video, navigation (AVN), a display, a warning sound speaker, or a haptic device.

3. The autonomous controller of claim 1, wherein the processor is configured to calculate the safety area based on the location of the seat of the driver when a rate at which a center of the vehicle departs from a center of the lane over a certain level during a predetermined time is not greater than a predetermined threshold.

4. The autonomous controller of claim 1, wherein the processor is configured to calculate the safety area based on the location of the seat of the driver when a deviation of a distance from a center of the vehicle from a center of the lane during a predetermined time is not greater than a predetermined threshold.

5. The autonomous controller of claim 1, wherein the processor is configured to calculate the safety area based on the location of the seat of the driver when an inter-vehicle distance between the vehicle and the forward vehicle is kept constant over a predetermined threshold.

6. The autonomous controller of claim 1, wherein the processor is configured to:
calculate a collision minimum safe distance from the forward vehicle using a relative vehicle speed with respect to the forward vehicle, and
calculate the safety area based on the location of the seat of the driver when a rate at which the vehicle violates the collision minimum safe distance during a predetermined time is not greater than a predetermined value.

7. The autonomous controller of claim 1, wherein the processor is configured to calculate the safety area based on the location of the seat of the driver when an amount of change in vehicle speed during a predetermined time is less than a predetermined value.

8. The autonomous controller of claim 1, wherein the processor is configured to calculate the safety area based on the location of the seat of the driver depending on whether sudden acceleration or deceleration occurs during a predetermined time.

9. The autonomous controller of claim 1, wherein the processor is configured to calculate the safety area based on the location of the seat of the driver when the face location of the driver is within a predetermined range.

10. The autonomous controller of claim 9, wherein the processor is configured to calculate the safety area based on the location of the seat of the driver when the face location of the driver is a location at which a view of the driver is least obstructed.

11. The autonomous controller of claim 1, wherein the processor is configured to calculate a safety area for each driver based on authentication information for each driver, and the storage stores information about the calculated safety area.

12. An autonomous control method comprising:
calculating, by a processor, a safety area for a driver of a vehicle to be able to keep eyes of the driver on a road, wherein the safety area includes information about at least one of a sliding location, a reclining angle, or a height of a seat of a driver, and wherein calculating the safety area includes calculating the safety area based on a location of the seat of the driver in response to determining, based on least one of a location of the vehicle in a lane, a distance from a forward vehicle, a change in vehicle speed, whether there is rapid deceleration or acceleration, or a face location of the driver, that the location of the seat of the driver is safe;
storing, in a storage, information about the safety area;
determining, by the processor, conversion into an autonomous driving mode based on a current location of the seat of the driver during manual driving, including
determining, by the processor, whether the current location of the seat of the driver is within the safety area when a request for conversion into the autonomous driving mode is input while driving in a manual driving mode;
converting, by the processor, the manual driving mode into the autonomous driving mode when the current location of the seat of the driver is within the safety area;
moving, by the processor, the current location of the seat of the driver into the safety area and converting the manual driving mode into the autonomous driving mode when the current location of the seat of the driver is not within the safety area;
outputting a state of the autonomous driving mode or the manual driving mode; and
notifying the driver that it is impossible to convert the manual driving mode into the autonomous driving mode when it is impossible to move the current location of the seat of the driver into the safety area.

13. The autonomous control method of claim 12, wherein calculating the safety area and storing the information about the safety area includes:
calculating a safety area for each driver based on authentication information for each driver and storing information about the calculated safety area.

* * * * *

UNITED STATES PATENT AND TRADEMARK OFFICE
CERTIFICATE OF CORRECTION

| | | |
|---|---|---|
| PATENT NO. | : 12,110,043 B2 | Page 1 of 1 |
| APPLICATION NO. | : 17/111103 | |
| DATED | : October 8, 2024 | |
| INVENTOR(S) | : Na Eun Yang et al. | |

It is certified that error appears in the above-identified patent and that said Letters Patent is hereby corrected as shown below:

On the Title Page

Item (72), Inventors, Line 1:
"Na Eun Yang, Gyeonggi-do (KR)"
Should be replaced with:
--Na Eun Yang, Hwaseongsi (KR)--.

Signed and Sealed this
Eleventh Day of February, 2025

Coke Morgan Stewart
*Acting Director of the United States Patent and Trademark Office*